United States Patent [19]

Weith

[11] 4,327,116

[45] Apr. 27, 1982

[54] BAKERY PRODUCTS CONSISTING PREDOMINANTLY OF BRAN AND METHOD OF PRODUCING THEM

[75] Inventor: Alois Weith, Vienna, Austria

[73] Assignee: STAMAG Stadkauer Malzfabrik Aktiengesellschaft, Vienna, Austria

[21] Appl. No.: 970,988

[22] Filed: Dec. 19, 1978

[30] Foreign Application Priority Data

Dec. 22, 1977 [AT] Austria .................................. 9226/77

[51] Int. Cl.³ .......................... A21D 8/00; A23L 1/168
[52] U.S. Cl. ...................................... 426/19; 426/560; 426/618; 426/615
[58] Field of Search ............... 426/549, 615, 618, 622, 426/463, 496, 560, 804, 19, 523

[56] References Cited

U.S. PATENT DOCUMENTS

| | | | |
|---|---|---|---|
| 1,054,695 | 3/1913 | Levin | 426/549 |
| 1,189,130 | 12/1915 | Kellogg | 426/463 |
| 4,109,018 | 8/1978 | Thompson | 426/804 |

FOREIGN PATENT DOCUMENTS

| | | | |
|---|---|---|---|
| 462986 | 3/1937 | United Kingdom. | |
| 565326 | 11/1944 | United Kingdom. | |
| 1510238 | 10/1975 | United Kingdom | 426/804 |

OTHER PUBLICATIONS

Heaton et al. *The Lancet*, "Effect of Bran on Blood Lipids and Calcium", 1-12-74, pp. 49 and 50.
Taylor et al., British Medical Journal, Apr. 24, 1976, "Bran Tables and Diverticular Disease", pp. 988-990.
De Gauy, The Bread Tray, Greenberg Publishers, N.Y. 1946, p. 87.
Richards, Bread, Rolls and Sweet Doughs, Balcers' Welper Co., Chicago, 1923, pp. 100-101.

*Primary Examiner*—Raymond N. Jones
*Assistant Examiner*—Elizabeth A. Hatcher
*Attorney, Agent, or Firm*—Spencer & Kaye

[57] ABSTRACT

Bakery products consisting predominantly of bran and a method of producing them are disclosed. The products are made by baking a dough, preferably in two stages, namely a baking stage and a drying stage at a lower temperature, which dough comprises 100 parts by weight of wheat bran and/or rye bran, from 200 to 500, preferably at least 250 parts by weight of water, from 2.5 to 15 parts by weight of vegetable thickening agent, preferably carob bean flour, and an optional amount of one or more conventional dough additives, such as acidification agents, raising agents, salt, sugar, spices, herbs, seeds and other flavoring agents.

20 Claims, No Drawings

BAKERY PRODUCTS CONSISTING PREDOMINANTLY OF BRAN AND METHOD OF PRODUCING THEM

FIELD OF THE INVENTION

This invention relates to bakery products consisting predominantly of bran, that is to say products having a high content of husk constituents of the bread cereal, and to a method of producing such products.

BACKGROUND OF THE INVENTION AND PRIOR ART

According to the present state of medical sciences an adequate intake of "fibrous materials" serves as casual therapy in cases of obstipation and intestinal diseases, such as occur for example in the case of diverticulosis; cf. W. Weiss and A. Neumayr, Ars medici 7, 292 (1976). It is also known that while not all fibrous materials have the same therapeutic effect, cereal fibres are of particular importance—see K. W. Heaton and E. W. Pomare, The Lancet 1, 49 (1974). An intake of 20 to 30 grams of bran per day is recommended as the customary dietetic dosage—see Congress Report Med. Tribune 37, 37 (1977).

It is still a matter of dispute how food can be enriched most effectively with indigestible ballast materials. Practical experience shows in fact that the intake by spoon of the required daily amount of bran is usually unacceptable over a long period of time. To administer bran in tablet form it has therefore already been proposed—cf. I. Taylor and L. Dutthie, Brit. Med. J. 989 (1976), as well as to administer it in admixture with liquid foods, such as milk, soups, etc.

It has, however, also been attempted to prepare dietetic breads enriched with bran, as is shown inter alia by "Handbuch der Ernahrungslehre" (Handbook of Nutritional Science) by C. V. Noorden, Volumes 1 and 2, Springer (1920, 1929). Such breads with added bran have been known for a long time, although these breads were usually intended to serve other purposes, such as for example protein enrichment or the reduction of carbohydrate intake. These breads include for example wholemeal breads or bran breads, such as are on sale in German—speaking countries, for example, under the names "Schlüterbrot", "Germanenbrot", "Klopferbrot", and "Roag-brot"—see the text book by Neumann-Pelshenke, "Brotgetreide und Brot" (Bread cereals and Bread), Page 516, Verlag P. Parey (1954). All these breads have the common feature than their bran content is so low that in order to meet the daily requirement of bran, a relatively large amount of the bread would have to be taken and such an amount would provide an unacceptably high intake of calories or joules. A ready-to-use flour, which has been descrived in the specification of Austrian Pat. No. 335 942 for making a protein-rich bread with a reduced carbohydrate content, contains only from 15 to 30% by weight of finely ground cellulose-rich plant material. A rather higher proportion of non-nutritive edible cellulose material, namely 10 to 50%, is used for preparing dough as described in the German Auslegeschrift No. 1,930,644, in which case, however, it is necessary for the dough to contain, in addition to from 1 to 10% of edible plant gum, an additional component in the form of 50% of so called "Vitalklebermehl" (Vital gluten flour) as a special component which on separation of the gluten from the starch produces a non-denatured "vital" gluten.

OBJECT OF THE INVENTION

It is an object of the present invention to produce, in contrast to bakery products which could be made hitherto with only a moderately increased proportion of cellulose, a bakery product which to a predominant extent consists of bran and which makes it possible for a daily amount of the cereal fibres to be administered in a simple, effective, and at the same time palatable form.

BRIEF DESCRIPTION OF THE INVENTION

According to the one aspect of the present invention there is provided a bakery product which has been obtained by baking a shaped dough, said dough comprising, prior to baking, 100 parts by weight of bran selected from wheat bran, rye bran and mixtures thereof, from 200 to 500 parts by weight of water, from 2.5 to 15 parts by weight of vegetable thickening agent, and an optional amount of one or more conventional dough additives selected from acidification agents, raising agents, salt, sugar, spices, herbs, seeds and other flavouring agents.

According to another aspect of the present invention there is provided a method of producing a bakery product consisting predominantly of bran, wherein a dough is prepared from a mixture of 100 parts bran selected from wheat bran, rye bran and mixtures thereof, 200 to 500 parts by weight of water, from 2.5 to 15 parts by weight of vegetable thickening agent and an optional amount of one or more conventional dough additives, selected from acidification agents, raising agents, salt, sugar, spices, herbs, seeds, and other flavouring agents, and wherein the dough is baked.

In carrying out this method, the operations serving to produce the bakery product, such as mixing, shaping, resting, knocking-back if appropriate, and baking, take place in the usual manner.

Swiss Pat. No. 151,948 describes a method of producing an enzymatically digested bran in which the bran is formed into dough with water and dried at from 30° to 40° C. in vacuo to form crusts. These bran crusts are then ground to yield a bran flour which is not used by itself, but is used together with rye flour to produce a wholemeal bread; the digested bran thus serves as a component of the flour which is to be baked. The production of a bakery product consisting predominantly of bran entails per se considerable technological difficulties in the preparation and processing of the dough. In the present method or the invention these difficulties are avoided of reduced by suitable selection and composition of the raw materials, thus permitting the production of a bakery product which consists predominantly of bran and which permits the administration of bran in medically desired daily amounts in a simple but at the same time agreeable manner for the consumer.

The bran needed for preparing the dough from which the present is made may be finely ground, evenly ground or a blend of finely ground and evenly ground. The behaviour of the dough can be controlled and the texture of the bakery product adjusted as desired through the degree of grinding of the husks and the consequent variation of water-binding power.

The preferred vegetable thickening agents are those which readily give up the water during the baking or drying process and do not impart excessive hydroscopicity to the finished bakery product, and include for example karaya or tragacanth. Carob bean flour is preferably used for this purpose, and is preferably present in the dough, prior to baking in an amount of from 5 to 10 parts by weight.

In the production of the present bakery product, it is found particulary expedient for the dough to be processed and baked in a relatively thin layer, preferably so as to result in a bakery product having a thickness of less than 1 cm.

Furthermore, it is found to be advantageous for the baking process to be effected in two stages, the baking in the first stage being effected for a short time at a higher temperature, preferably at from 180° to 260° C., and drying being effected in the second stage at a lower temperature, preferably at from 50° to 120° C.

If desired, the dough used in the present method and from which the bakery product is made may be subject to raising with yeast. If yeast is not used for raising, raising can be achieved solely through the generation of steam during the baking process. If however, as is often preferable, yeast is used for raising purposes, the yeast is added as raising medium, optionally together with sugar, to the dough mixture, thus ensuring that the raising of the bakery product will be effected not only through the generation of steam but also through the generation of carbon dioxide during the baking process.

The present bakery product is similar to crisp-bread and can be kept for a relatively long time. In addition, it is particularly advantageous for the dough, before being baked, to be brought into a suitable shape in a thin layer, which is particularly acceptable to consumers for dietary use, so that, for example, the resulting bakery product is in the form of round or elongated crackers, biscuits, cookies, or like shaped products. This can be achieved by means of methods known per se, such as are customary for example in the production of biscuits and crackers, and that baking produces a product having a snack-like character, such as is popular as a between-meals snack or as an accompaniment to beverages, for example wine. Because of its high bran content and the fact that it can be made in an attractive shape, by the present bakery product it is made considerably easier to take the amount of bran prescribed for the diet.

The bran used in making the present bakery product may comprise either rye husks or wheat husks, or a mixture of them.

The dough may be mixed in the usual manner with conventional dough additives, including acidification agents, salt, bread spices or other customary additives, such as herbs, seeds, for example linseed, sesame seeds, and other flavouring agents.

EXAMPLES OF THE INVENTION

The invention will now be illustrated by the following examples.

Example 1

200 parts by weight of wheat bran are worked up into a dough with 2 parts by weight of a pulverulent dough acidification agent containing a taste-imparting acid, 13 parts by weight of caraway seeds, 15 parts by weight of carob bean flour, and 700 parts by weight of water, and after standing for about 2 hours a thin layer of the dough is placed on a baking sheet with a maximum thickness of approximately finger thickness. The shaped dough is baked at a temperature of about 260° C. for about 10 minutes, followed by drying at a temperature of 80° C. unit dry baked product is obtained, which takes about 3 hours.

Example 2

The procedure is the same as in Example 1, but the dough is formed from a mixture comprising: 200 parts by weight of bran, 2 parts by weight of dough acidification agent, 8 parts by weight of caraway seeds, 10 parts by weight of tragacanth, and 700 parts by weight of water. A baked product similar to crispbread is obtained.

Example 3

175 parts by weight of wheat bran are worked up into a dressable dough with 2 parts by weight of dough acidification agent, 7.5 parts by weight of carob bean flour, 7.5 parts by weight of caraway seeds, 5 parts by weight of cooking salt, and 650 parts by weight of water; after standing for a short time, the dough is placed in small portions, for example in biscuit form, on a siliconised baking sheet. After baking in the manner described in Example 1, a baked product is obtained which is similar to a snack biscuit.

I claim:

1. A bakery product consisting predominantly of bran which has been obtained by baking a shaped dough, said dough comprising prior to baking, 100 parts by weight of bran selected from the group consisting of wheat bran, rye bran and mixtures thereof, from 200 to 300 parts by weight of water, and from 2.5 to 15 parts by weight of vegetable thickening agent which is carob bean flour.

2. The bakery product of claim 1, wherein the bran has been ground.

3. The bakery product of claim 1, wherein the bran has been finely ground.

4. The product of claim 1, wherein said dough, prior to baking, contains at least one conventional dough additive selected from the group consisting of acidification agents, raising agents, salt, sugar, seeds, bread seasoning and other flavouring agents.

5. The product of claim 4, wherein the raising agent is yeast.

6. The bakery product of claim 5 wherein the vegetable thickening agent is present in said dough, prior to baking, in an amount of 5 to 10 parts by weight.

7. The bakery product of claim 1, said dough, prior to baking, comprising at least 250 parts by weight of water.

8. The bakery product of claim 1, wherein the product has a thickness of less than 1 cm.

9. The bakery product of claim 1, wherein the product is in the form of crisp-bread or crackers.

10. A method of producing a bakery product consisting predominantly of bran, comprising the steps of preparing a dough essentially consisting of 100 parts by weight of bran selected from the group consisting of wheat bran, rye bran and mixtures thereof, from 200 to 300 parts by weight of water, and from 2.5 to 15 parts by weight of vegetable thickening agent which is carob bean flour, and baking said dough.

11. The method of claim 10, wherein said bran has been ground.

12. The method of claim 10, wherein said bran has been finely ground.

13. The method of claim 10, wherein said dough additionally contains at least one conventional dough additive selected from the group consisting of acidification agents, raising agents, salt, sugar, bread seasoning seeds, and other flavouring agents.

14. The method of claim 13, wherein the raising agent is yeast.

15. The method of claim 10, wherein the vegetable thickening agent is present in said dough in an amount of 5 to 10 parts by weight.

16. The method of claim 10, wherein said dough comprises at least 250 parts by weight of water.

17. The method of claim 10, wherein the baking is effected in two stages, the first stage being a baking stage and the second stage being a drying stage conducted at a lower temperature than the baking stage.

18. The method of claim 17, wherein the first stage is conducted at a temperature of about 200° C.

19. The method of claim 10, wherein the dough is shaped to form a relatively thin layer prior to baking, thereby to provide a bakery product in the form of crackers, or crisp-bread.

20. The method of claim 19, wherein the bakery product has a thickness of less than 1 cm.

* * * * *

UNITED STATES PATENT AND TRADEMARK OFFICE
CERTIFICATE OF CORRECTION

PATENT NO. : 4,327,116

DATED : April 27, 1982

INVENTOR(S) : Alois Weith

It is certified that error appears in the above—identified patent and that said Letters Patent is hereby corrected as shown below:

In the heading of the patent, under [73], change "Stadkauer" to --Stadlauer--.
Column 1, line 57, change "descrived" to --described--.
Column 2, line 51, change "method or" to --method of--;
          line 52, change "avoided of" to --avoided or--;
          line 59, after "present" insert --bakery product--;
          line 67, change "hydro-" to --hygro- --.
Column 3, line 1, change "exanple" to --example--;
          line 43, change "by the present" to --with the present--
Column 4, line 1, change "unit" to --until--;
          line 19, change "tine" to --time--.
Column 5, line 1, after "bread seasoning" insert --,--.

Signed and Sealed this

Fifth Day of October 1982

[SEAL]

Attest:

GERALD J. MOSSINGHOFF

Attesting Officer        Commissioner of Patents and Trademarks